United States Patent
Gondoh

(10) Patent No.: US 7,091,648 B2
(45) Date of Patent: Aug. 15, 2006

(54) ACTUATOR ADOPTING THE PRINCIPLE OF ELECTROSTATIC INDUCTION

(75) Inventor: Masahiko Gondoh, Kitatsuru-gun (JP)

(73) Assignee: Olympus Corporation, Tokyo (JP)

( * ) Notice: Subject to any disclaimer, the term of this patent is extended or adjusted under 35 U.S.C. 154(b) by 198 days.

(21) Appl. No.: 10/797,554

(22) Filed: Mar. 10, 2004

(65) Prior Publication Data
US 2004/0189144 A1  Sep. 30, 2004

(30) Foreign Application Priority Data
Mar. 28, 2003  (JP) .............................. 2003-090061

(51) Int. Cl.
*H02N 1/00* (2006.01)
(52) U.S. Cl. .................................................... 310/309
(58) Field of Classification Search ................. 310/309
See application file for complete search history.

(56) References Cited

U.S. PATENT DOCUMENTS

| | | | |
|---|---|---|---|
| 5,239,222 A | 8/1993 | Higuchi et al. ............. 310/309 |
| 5,448,124 A * | 9/1995 | Higuchi et al. ............. 310/309 |
| 5,541,465 A * | 7/1996 | Higuchi et al. ............. 310/309 |
| 6,611,079 B1 * | 8/2003 | Koga et al. ................. 310/309 |
| 6,680,558 B1 * | 1/2004 | Akiba et al. ................ 310/309 |
| 2004/0189144 A1 * | 9/2004 | Gondoh ....................... 310/309 |
| 2005/0040729 A1 * | 2/2005 | Gondoh ....................... 310/309 |
| 2005/0195097 A1 * | 9/2005 | Gondoh ........................ 341/15 |

FOREIGN PATENT DOCUMENTS

| | | |
|---|---|---|
| DE | 293 013 | 8/1991 |
| EP | 1 193 853 A2 | 4/2002 |
| EP | 1 202 099 A2 | 5/2002 |
| GB | 500 161 | 2/1939 |
| JP | 06-038552 | * 2/1994 |
| JP | 08-149858 | * 6/1996 |
| JP | 2004-297971 | * 10/2004 |

OTHER PUBLICATIONS

Machine translation of 08-149,858, higuchi et al., Jun. 1996.*

* cited by examiner

*Primary Examiner*—Karl Imayoshi Tamai
(74) *Attorney, Agent, or Firm*—Scully, Scott, Murphy & Presser, P.C.

(57) ABSTRACT

An electrostatic actuator comprises a movable element provided with electrodes, and a stator provided with inductive electrodes for generating electrostatic induction in the electrodes of the movable element. The electrodes of the movable element includes a driven electrode part provided at a position opposite to the driving electrodes of the stator, and an induced electrode part provided at a position opposite to the inductive electrodes of the stator. The movable element is displaced relatively to the stator by generating electrostatic force between the driving electrodes of the stator and the driven electrode part in the movable element in which the electrostatic induction is generated, by applying a voltage to the driving electrodes of the stator, while generating electrostatic induction in the electrodes of the movable element through the induced electrode part by applying a voltage to the inductive electrodes of the stator.

11 Claims, 10 Drawing Sheets

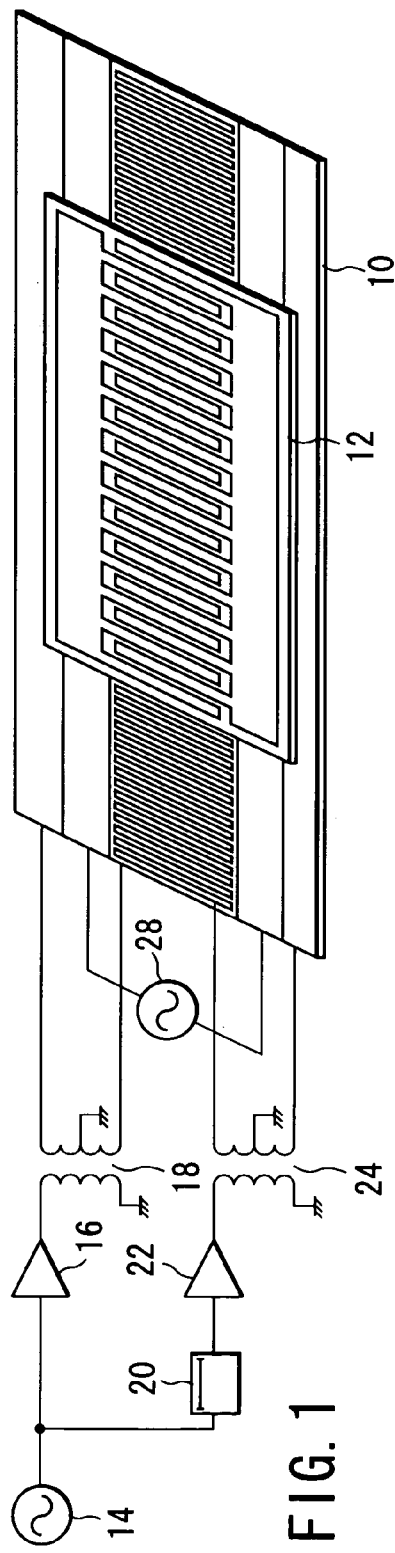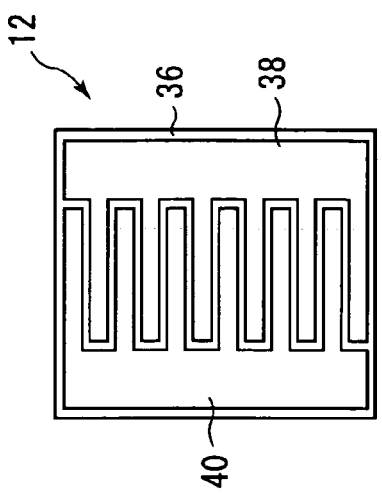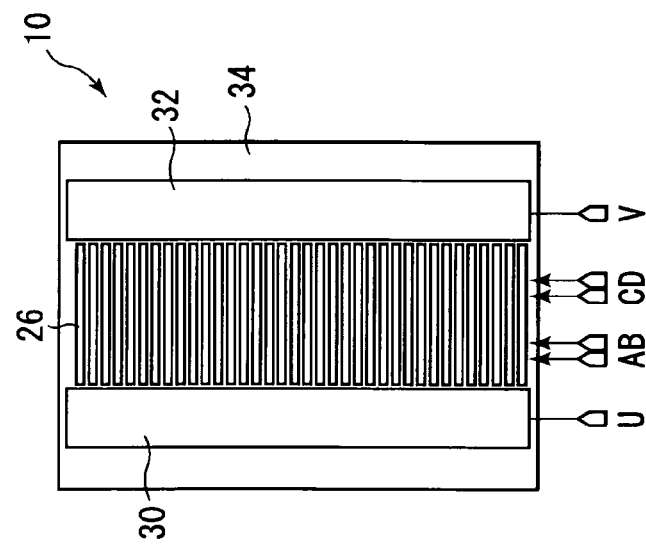

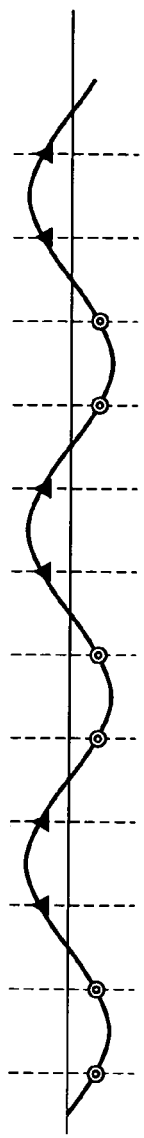
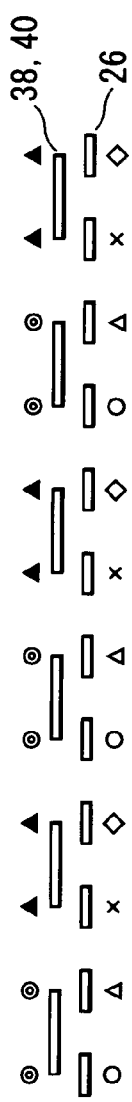
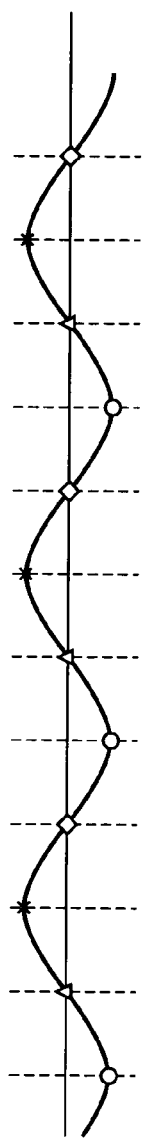
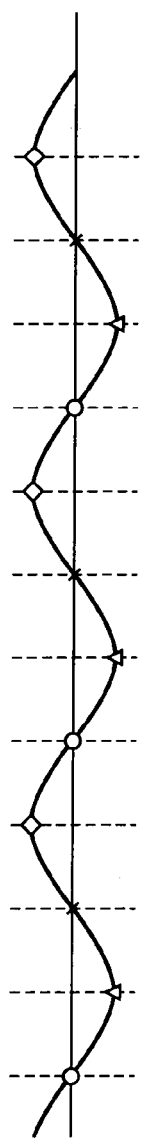
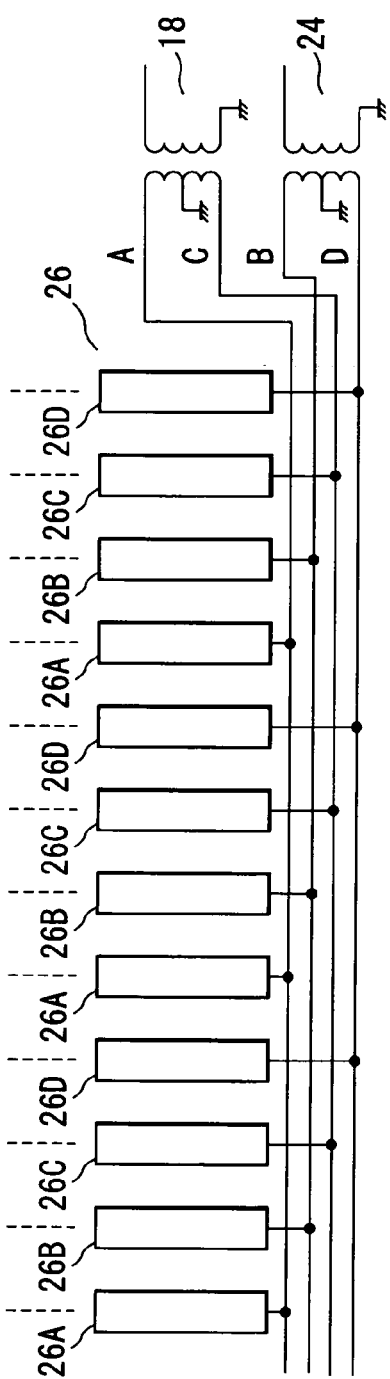
FIG. 8A
FIG. 8B
FIG. 8C
FIG. 8D
FIG. 8E

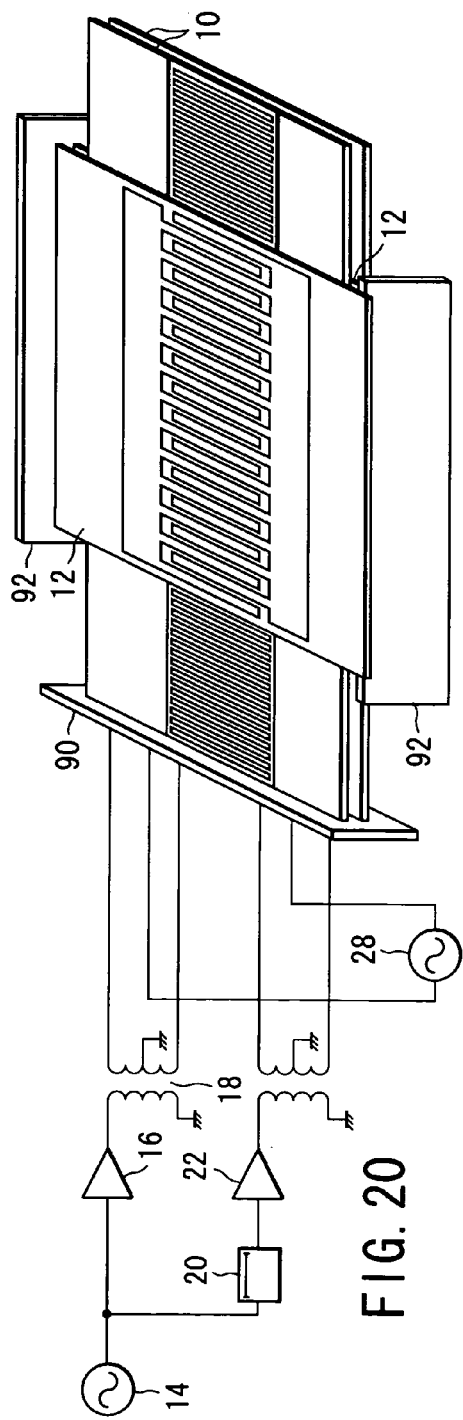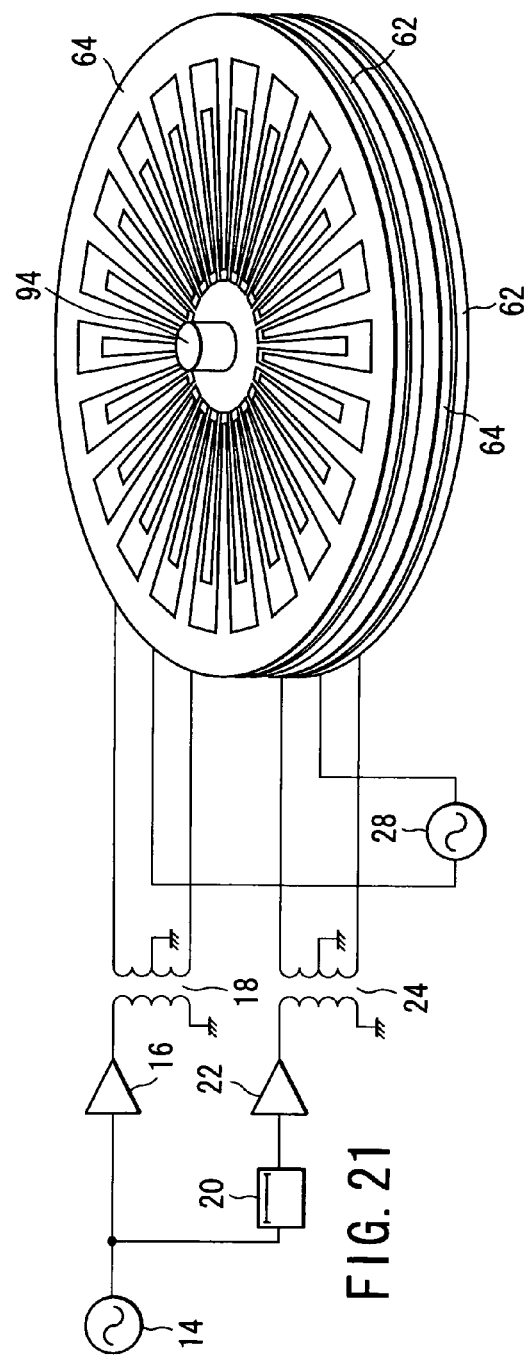

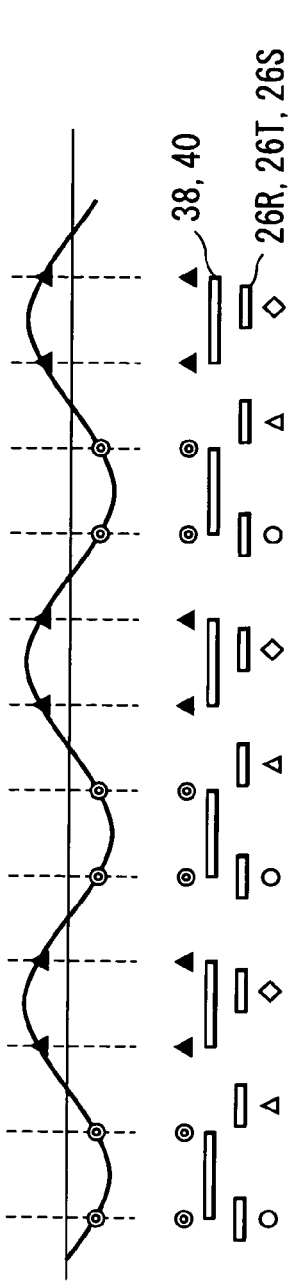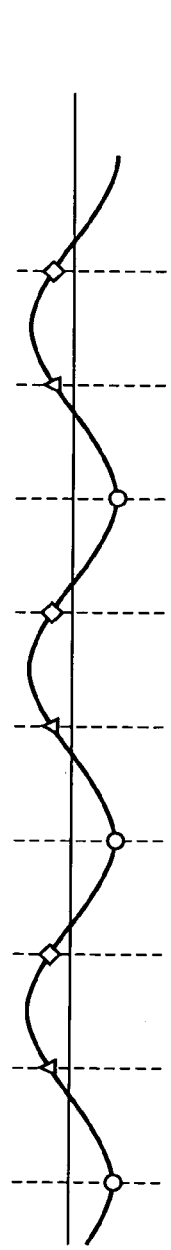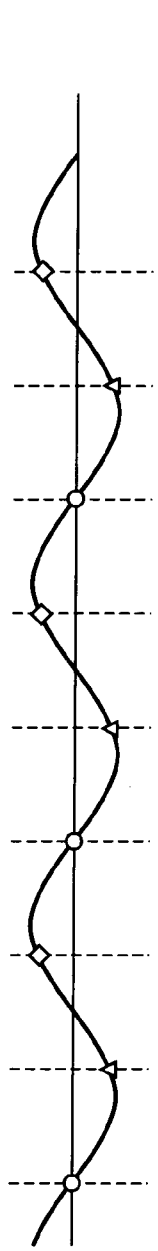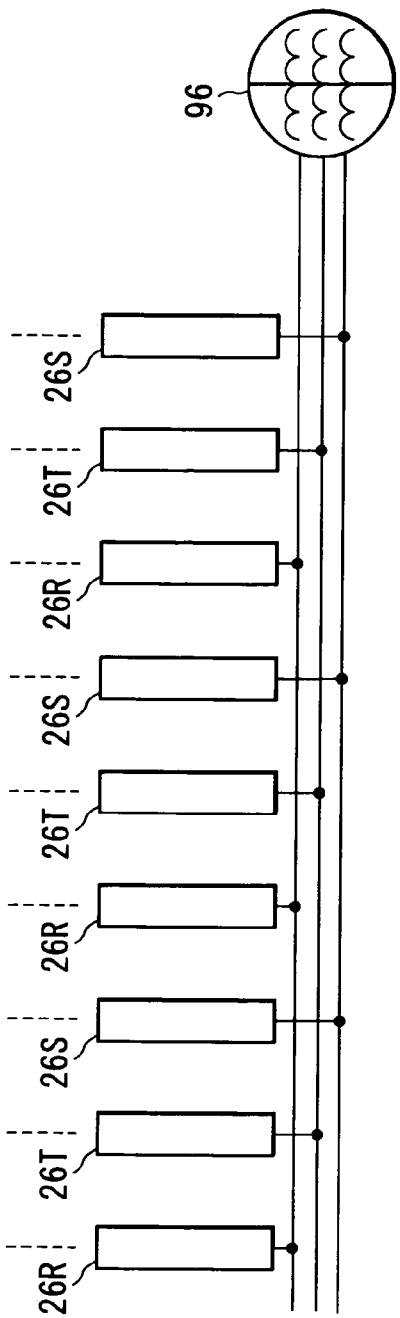
FIG. 22A
FIG. 22B
FIG. 22C
FIG. 22D
FIG. 22E

ACTUATOR ADOPTING THE PRINCIPLE OF ELECTROSTATIC INDUCTION

CROSS-REFERENCE TO RELATED APPLICATIONS

This application is based upon and claims the benefit of priority from prior Japanese Patent Application No. 2003-090061, filed Mar. 28, 2003, the entire contents of which are incorporated herein by reference.

BACKGROUND OF THE INVENTION

1. Field of the Invention

The present invention relates to an electrostatic actuator which is operated by the action of static electricity, and a method of displacement.

2. Description of the Related Art

A conventional actuator and motor are operated mostly by the action of electromagnetic force, and the weights of the permanent magnet and iron core are heavy. Further, the loss of the current flowing in a winding causes enormous heat generation.

On the other hand, an ultrasonic actuator and an ultrasonic motor operated by forces other than electromagnetic force are known. They are driven by the frictional force of a piezoelectric transducer, but their life is too short due to deterioration caused by friction. Besides, for accurate positioning, it is necessary to control the position by using a position sensor such as an encoder. Further, for reducing the size of an ultrasonic actuator, it is necessary to increase the resonance frequency of a piezoelectric element. However, the increased frequency makes it difficult to operate at a low speed.

To solve these problems, several types of electrostatic actuator using electrostatic force have been researched and proposed. Two typical types have been proposed as an actuator capable of generating a relatively large force.

One is the electrostatic actuator disclosed in U.S. Pat. No. 5,448,124 or U.S. Pat. No. 5,541,465. This has a plurality of belt-like electrodes disposed with predetermined intervals in both stator and movable element, and displaces and drives the movable element by the electrostatic force between the stator and movable element by connecting/applying an AC power supply to the electrodes of both stator and movable element.

The other is the contact type electrostatic actuator disclosed in U.S. Pat. No. 5,239,222. This has a stator and a movable element, and applies electric charges from the stator to the movable element comprising a film having a predetermined surface resistivity, and obtains a displacement driving force by generating electrostatic force between the stator and movable element by utilizing a polarization time delay of a dielectric in the movable element.

BRIEF SUMMARY OF THE INVENTION

According to a first aspect of the present invention, there is provided an electrostatic actuator comprising: a movable element which is provided with electrodes; and a stator which is provided with driving electrodes and inductive electrodes for generating electrostatic induction in the electrodes of the movable element. The electrodes of the movable element includes a driven electrode part provided at a position opposite to the driving electrodes of the stator, and an induced electrode part provided at a position opposite to the inductive electrodes of the stator. The movable element is displaced relatively to the stator by generating electrostatic force between the driving electrodes of the stator and the driven electrode part in the movable element in which the electrostatic induction is generated, by applying a voltage to the driving electrodes of the stator, while generating electrostatic induction in the electrodes of the movable element through the induced electrode part by applying a voltage to the inductive electrode of the stator.

According to a second aspect of the present invention, there is provided an electrostatic actuator comprising: a stator having two or more inductive electrodes arranged one of substantially parallel and concentric and a plurality of driving electrodes arranged with a predetermined cycle; a movable element having at least two combined electrode structures; and a displacement means for displacing the movable element by generating electric charges in the electrodes of the movable element via the inductive electrodes of the stator, and generating electrostatic force between the electric charges and the driving electrodes of the stator.

According to an aspect of the present invention, there is provided a method of displacement comprising: placing inductive electrodes and driving electrodes at different positions where electrodes of a movable element and a part of them face each other; and generating electric charges in the electrodes of the movable element by electrostatic induction by applying a voltage to the inductive electrodes, and displacing the relative position of the electrodes of the movable element to the driving electrodes by the electrostatic force by the electric charges generated in the driving electrodes and the electrodes of the movable element.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a schematic configuration of an electrostatic actuator according to a first embodiment of the present invention;

FIG. 2 is a view for explaining the configuration of a stator;

FIG. 3 is a view for explaining the configuration of a movable element;

FIG. 8A shows the potential distribution by the true electric charges generated by electrostatic induction in the comb-like electrodes of a movable element;

FIG. 8B shows the relationship between the cross sections of the comb-like electrode and driving electrodes of a stator;

FIG. 8C shows the space potential distribution on the driving electrodes when electricity of "−", "0", "+" and "0" is applied to the driving electrodes of a stator;

FIG. 8D shows the space potential distribution on the driving electrodes when electricity of "0", "−", "0" and "+" is applied to the driving electrodes of the stator;

FIG. 8E shows the connection of the driving electrodes;

FIG. 20 is a view showing the configuration of an electrostatic actuator according to a fifth embodiment of the invention;

FIG. 21 is a view showing the configuration of an electrostatic actuator according to a sixth embodiment of the invention;

FIG. 22A shows the potential distribution by the true electric charges generated by electrostatic induction in the comb-like electrodes of a movable element in an electrostatic actuator according to the seventh embodiment of the invention;

FIG. 22B shows the relationship between the cross sections of the comb-like electrodes and three-phase driving electrodes of a stator;

FIG. 22C shows the space potential distribution on the driving electrodes when certain potentials are applied to the three-phase driving electrodes;

FIG. 22D shows the space potential distribution on the driving electrodes when another potentials are applied to the three-phase driving electrodes; and FIG. 22E shows the connection of the three-phase driving electrodes.

DETAILED DESCRIPTION OF THE INVENTION

Figure 4:
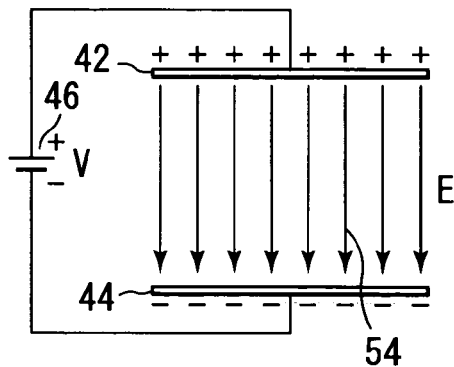
FIG. 4 is a view for explaining an electric field generated when a voltage is applied to two electrodes.

Hereinafter, preferred embodiments of the present invention will be explained with reference to the accompanying drawings.

Embodiment 1

As shown in FIG. 1, the electrostatic actuator according to a first embodiment of the present invention has a stator 10 and a movable element 12. The stator 10 is supplied with a high-voltage generated by flowing the output signal of an AC generator 14 to an amplifier 16 and a high-voltage transformer 18. At the same time, the stator 10 is also supplied with a high-voltage generated by flowing the output signal of the AC generator 14 delayed by a phase shifter 20 to a high-voltage amplifier 22 and a high-voltage transformer 24. In this case, the outputs of the high-voltage transformers 18 and 24 are applied to driving electrodes 26 of the stator 10 through connection terminals A, B, C and D, as shown in FIG. 2. The output of an AC driving source 28 is applied to inductive electrodes 30 and 32 of the stator 10 through connection terminals U and V. The inductive electrodes 30, 32 and driving electrodes 26 of the stator 10 are built in a film-like insulator 34. A movable element 12 is put on the stator 10.

In the movable element 12, as shown in FIG. 3, comb-like electrodes 38 and 40 are interdigitated in an insulator 36. Particularly, the movable element 12 has no terminal for external connection, and receives electrostatic energy through the inductive electrodes 30 and 32 of the stator 10. In the state of FIG. 1, the movable element 12 receives electrostatic force or Coulomb force of static electricity, and moves sideways on the stator 10. The pitch of the comb-like electrodes 38 and 40 of FIG. 3 is double the pitch of the driving electrodes 26 of FIG. 2.

Figure 5:
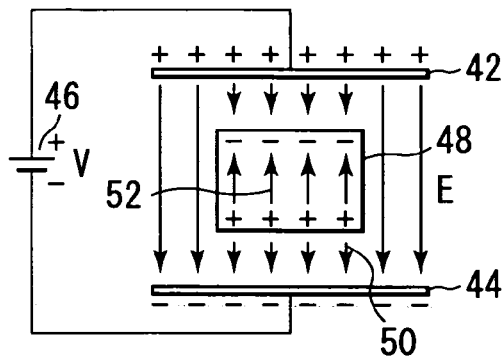
FIG. 5 is a view for explaining true electric charge generated on the surface of a conductor when the conductor is inserted into the electric field in the state of FIG. 4.

Now, explanation will be given on the principle of electrostatic induction, the basis for generation of true electric charge in the comb-like electrodes 38 and 40 of the movable element 12. As shown in FIG. 4, when a voltage V is applied from an external power supply 46 to two electrodes 42 and 44, the electrode 42 is supplied with a positive electric charge "+" and the electrode 44 is supplied with a negative electric charge "−", an electric field E is generated between these electrodes. When a conductor 48 is inserted into the electric field E in this state, as shown in FIG. 5, an electric flux line 50 is cut off. As a result, negative and positive electric charges are generated on the surface of the conductor 48, so that an electric flux line 52 is generated in the reverse direction to an electric flux line 54 of FIG. 4 to make the electric field in the conductor 48 zero. These are the electric charges generated in a conductor, and called "true electric charges" to be discriminated from the electric charges generated by dielectric polarization. Paying attention to the conductor 48, though the conductor 48 is not connected to outside, two types, positive and negative, of electric charges are generated on the surface of the conductor because of being located in an electric field. This phenomenon may be difficult to understand from simple common sense, but it is the basic principle of the present invention.

Next, by using the above-mentioned principle of electrostatic induction, explanation will be given on the principle of generating positive and negative true electric charges at the comb tooth end electrodes of the comb-like electrodes 38 and 40 of the movable element 12 by referring to FIG. 6. A positive charge is applied from the external power supply 46 to the inductive electrode 30 of the stator 10, and a negative charge is applied to the inductive electrode 32. In this time, a negative true electric charge is induced at the base of the comb-like electrode 38 of the movable element 12, based on the above-mentioned principle of electrostatic induction. Similarly, a positive true electric charge is induced at the comb tooth end of the comb-like electrode 38. On the other hand, a positive true electric charge is induced at the base of the comb-like electrode 40, and a negative true electric charge is induced at the comb tooth end. In the central area where the comb teeth of the two comb-like electrodes 38 and 40 are confronted, the electrodes are insulated and positioned close to each other. Therefore, the positive and negative electric charges are attracted each other, and the true electric charges are distributed on the surface of the comb tooth with certainly uniform density. As described above, by the electrostatic induction and interdigitated two comb-like electrodes, alternating electric charges having alternate distribution of positive and negative true electric charges are formed near the central area of the electrode.

Figure 7:
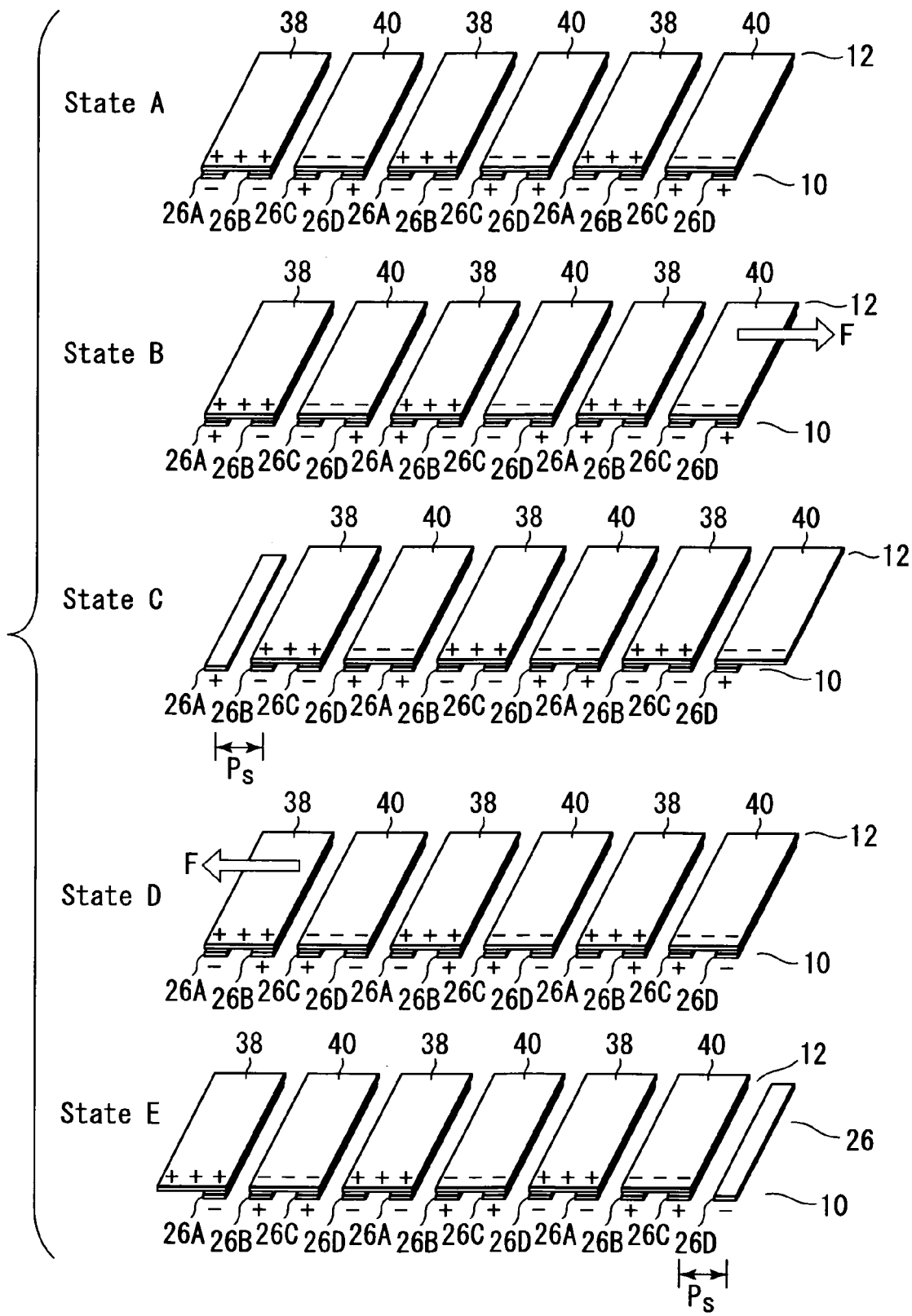
FIG. 7 shows views for explaining the principle of displacing and driving a movable element.

Next, explanation will be given on the principle of displacing and driving the movable element 12 by referring to FIG. 7. The state A indicates the movable element 12 at standstill. In this state, the driving electrodes 26A, 26B and 26C, 26D of the stator 10 are supplied with the same polarity voltages "−", "−" and "+", "+", respectively. On the other hand, in the central area where the comb-like electrodes 38 and 40 of the movable element 12 are interdigitated, positive and negative true electric charges are induced alternately, just like "+", and "−". In this state, the pitch of the electrodes of the movable element 12 is double the pitch of the electrodes of the stator, and the electric charges of the stator electrodes (driving electrodes 26A, 26B, 26C and 26D) and movable element electrodes (comb-like electrodes 38 and 40) are positive and negative or negative and positive, and located at the nearest distance. Therefore, a Coulomb force of attraction acts between the driving electrodes 26A, 26B, 26C, 26D of the stator 10 and comb-like electrodes 38, 40 of the movable element 12, and the movable element 12 is stopped stably against the stator 10.

The state B shows the case where the driving electrodes 26A, 26B, 26C and 26D are supplied with voltages "+", "−" and "+", respectively. In this state, the force F to move the movable element 12 to the right is generated by the Coulomb force of static electricity between the driving electrodes 26A, 26B, 26C, 26D of the stator 10 and the comb-like electrodes 38, 40 of the movable element 12. Specifically, vectors diagonally toward to upper right, diagonally to lower right, upward and downward act on each of the comb-like electrodes 38 and 40. These vectors are integrated, and the force F is generated as a rightward force vector.

While the voltage supplying state is being held, the movable element 12 moves to the right by the distance equivalent to the electrode pitch $P_s$, and stops at the position where the Coulomb force between the stator 10 and movable element 12 becomes the maximum, as shown in the state C. Except the movement by the pitch $P_s$, this state C is the same as the above-mentioned state A, and the movable element 12 is stopped stably after being displaced.

Next, explanation will be given on the principle of displacing to the left. From the state A, the voltage applied to the driving electrodes 26A, 26B, 26C and 26D of the stator 10 are switched to the voltages "−", "+", "+" and "−" as shown in the state D. In the state D, the force F of moving to the left acts between the comb-like electrodes 38 and 40 as the sum of Coulomb force vectors received by each electrode. While the voltage supplying state is being held, the movable element 12 moves to the left by the distance equivalent to the electrode pitch $P_s$, and stops at the position where the Coulomb force between the stator 10 and movable element 12 becomes the maximum, as shown in the state E.

As describe above, when the movable element 12 moves, the force of displacing to the right or left is generated as the sum of Coulomb forces of each electrode, and after displacing to a predetermined position, the movable element 12 is firmly attracted by the stator 10 by the vertical moving force generated in the clearance to the stator 10. From another viewpoint, the movable element 12 is firmly attracted and held in the vertical direction while standing still, but after moving to the displacement state, the attraction force does not act in the vertical direction of the stator 10 and movable element 12, and the movable element can move smoothly while being hardly affected by friction.

The above explanation referring to FIG. 4 to FIG. 7 uses a DC voltage for ease of understanding. However, actually, an electrostatic actuator is driven by an AC signal. Therefore, actual drive by AC voltage will be explained.

In the principle of electrostatic induction explained in FIG. 4 and FIG. 5, even if the voltage applied to the electrodes 42 and 44 is changed to AC, the polarity of induced electric charge is merely changed to positive and negative alternately, and electrostatic induction occurs as in the case of DC.

Now, explanation will be given on the process of forming an alternating potential distribution by the voltage applied to each electrode with reference to FIG. 8A to FIG. 8E. FIG. 8A shows the potential distribution by the true electric charges generated by electrostatic induction in the comb-like electrodes 38 and 40 of the movable element 12. In the drawing, the black triangle indicates the potential generated by the positive electric charge in the comb-like electrode 38. The double circle indicates the potential generated by the negative electric charge in the comb-like electrode 40. In the electrostatic induction, true electric charges are generated on the surface of a conductor, the positive and negative electric charges of the comb-like electrodes 38 and 40 attract each other, and the electric charges are collected at both ends of the cross section of the electrode. Since two pitches of the comb-like electrode make one cycle of space frequency and there are four sampling points, the conditions of the sampling theorem are satisfied.

The relationship between the cross sections of the comb-like electrodes 38, 40 and the driving electrode 26 of the stator is as shown in FIG. 8B. The driving electrodes 26 are connected by four pieces, as shown in FIG. 8E. When negative potential (circle) is applied to the line A, zero potential (white triangle) is applied to the line B, positive potential (X) is applied to the line C and zero potential (lozenge) is applied to the line D, the potential on the driving electrodes 26 of the stator 10 becomes as shown in FIG. 8C. Since a Coulomb force of static electricity acts between this potential distribution (FIG. 8C) and the potential distribution (FIG. 8A) in the movable element 12, the force of moving to the right acts on the movable element 12 (comb-like electrodes 38, 40). Likewise, FIG. 8D shows the space potential distribution when zero potential (circle) is applied to the line A, negative potential (triangle) is applied to the line B, zero potential (X) is applied to the line C, and positive potential (lozenge) is applied to the line D. In this case, the Coulomb force of moving the movable element 12 (comb-like electrodes 38, 40) to the left acts between this distribution (FIG. 8D) and the potential distribution (FIG. 8A) of the movable element 12.

In the connection of the driving electrodes 26, the line A is connected to the secondary side positive winding of the high-voltage transformer 18, and the line C is connected to the secondary side negative winding of the high-voltage transformer 18, as shown in FIG. 8E. Likewise, the line B is connected to the secondary side positive winding of the high-voltage transformer 24, and the line D is connected to the secondary side negative winding of the high-voltage transformer 24. Further, by changing the phases of the primary side inputs of the high-voltage transformer 18 and high-voltage transformer 24 by 90 degrees, a sinusoidal space potential distribution can be easily created, as shown in FIG. 8C or FIG. 8D. The phase shifter 20 shown in FIG. 1 is used to change the phases. FIG. 8C shows the case where the phase of the primary input of the high-voltage transformer 18 is advanced by 90 degrees against the primary input of the high-voltage transformer 24. FIG. 8D shows the case where the phase is delayed by 90 degrees.

The connection using the electrode 26 and transformers 18 and 24 shown in FIG. 8E is similar to the technique of creating a complex number signals comprising a real number and an imaginary number by orthogonal sampling of high-frequency signals, when the electrode arrangement space is regarded as a time axis.

FIG. 8A to FIG. 8E show the process of forming alternate positive and negative electric charges in the comb-like electrodes 38 and 40. Each part of the comb-like electrodes 38 and 40 can be considered separately according to function. Namely, since the base of the comb-like electrode located in the upper part opposite to the inductive electrodes 30 and 32 of the stator 10 are the part to receive electrostatic induction, it is considered to be an induced electrode part. Since the other parts of the comb-like electrode are used to receive the action of displacement and driving, they can be classified as a driven electrode part. The driven electrode parts consist of two interdigital electrodes, and the above-mentioned alternating electric charges are formed in this electrode part.

Figure 9:
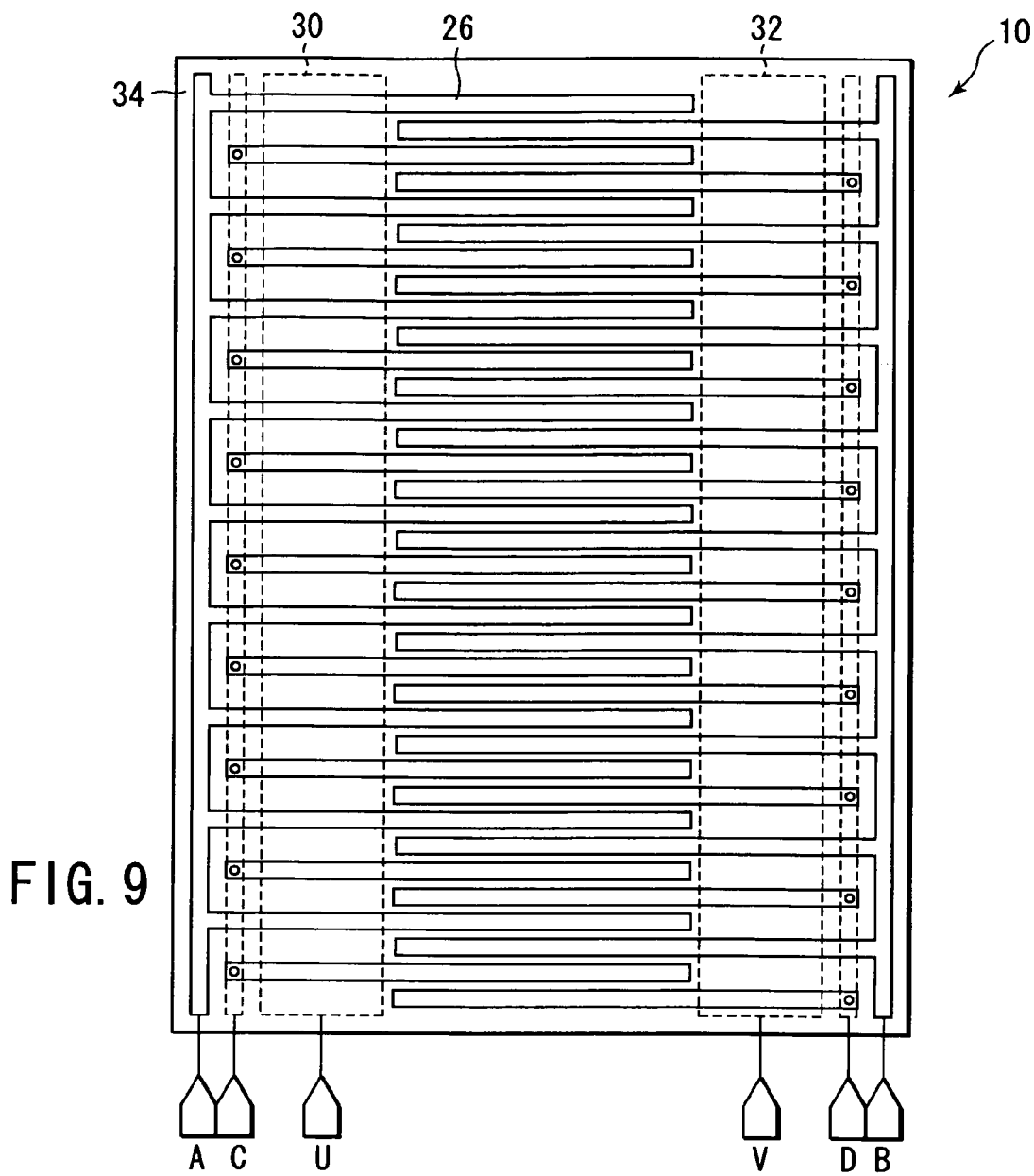
FIG. 9 is the rear view of a stator for explaining the electrode structure of stator in detail.

FIG. 9 is a rear view of the stator 10 showing the detailed electrode configuration. The driving electrodes 26 are arranged with a pitch $P_s$ on the rear surface of the insulator 34 made of polyimide, for example. The driving electrodes 26 are connected by four pieces as explained with reference to FIG. 8E, and connected by using vertical lines. In this time, the connection lines A and B are arranged on the rear surface of the stator 10, the connection lines C and D are arranged on the front surface, and these lines are connected via through holes. With this arrangement, the lines are arranged symmetrically on the left and right sides, and they can be handled neatly. The inductive electrodes 30 and 32 are arranged on the surface of the stator 10, and led out from the terminals U and V. Since all electrode connections are completed only on the front and rear surfaces of the stator 10, the stator 10 can be easily made of a double-sided flexible PC board, for example.

Now, explanation will be given on the traveling waves generated in the stator 10 and movable element 12, and the principle of moving the removable element 12 at a predetermined speed by the mutual action of the generated traveling waves, by referring to FIG. 10 to FIG. 12.

First, the traveling wave generated in the movable element 12 will be explained by referring to the FIG. 10. In FIG. 10, the horizontal axis represents the space in the electrode arrangement direction, and the vertical axis represents time. At a certain time t, an alternating potential distribution is generated in the electrode space in the comb-like electrodes 38 and 40, as explained in FIG. 8A. This alternating potential distribution forms a space frequency which takes $2P_m$ as one cycle. When AC voltage of $f_m$ frequency shown at the right end of FIG. 10 is applied to the electrode array, the potentials change with the $f_m$ frequency in the state that a phase offset is being applied to each electrode. Namely, when a spatial phase offset is given to the electrode array and an AC signal is applied to the electrode array, the potential distribution in the space is moved with time. This is called a traveling wave. The traveling wave speed $V_m$ of the movable element 12 is shown by the slope indicated by the thick dotted line in the drawing, and is given by the following equation:

$$V_m = \Delta d_m / \Delta t_m \quad (1)$$
$$= 2P_m \cdot f_m = 4P_s \cdot f_m$$

It is seen from this equation that the traveling wave speed is increased as the electrode pitch $P_m$ and AC voltage frequency $f_m$ is increased. The waveform indicated by the thin dotted line in FIG. 10 does not actually exist, because the comb-like electrodes 38 and 40 are at zero potential. This is an imaginary space potential distribution waveform obtained when time is interpolated.

Next, explanation will be given on the traveling wave generated in the driving electrodes 26A, 26B, 26C, 26D of the stator 10 by referring to FIG. 11. By the same principle as that explained about the traveling wave speed $V_m$ of the movable element 12, when offset phases are given to the driving electrodes 26A, 26B, 26C and 26D, and AC current at the frequency $f_s$ is applied to the electrodes, a traveling wave is generated. The moving speed $V_s$ of this traveling wave is indicated by the thick solid line in the drawing, and given by the following equation:

$$V_s = \Delta d_s / \Delta t_s \quad (2)$$
$$= 4P_s \cdot f_s = 2P_m \cdot f_s$$

Figure 10:
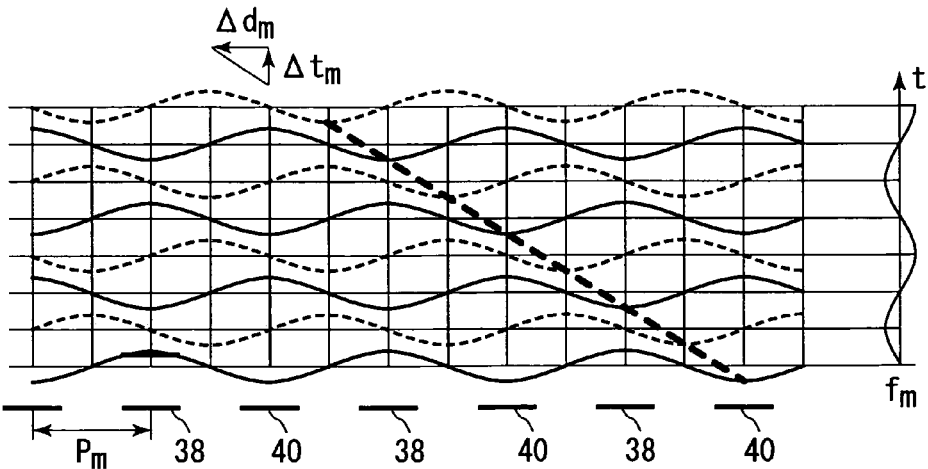
FIG. 10 is a view for explaining a traveling wave generated in a movable element.
Figure 11:
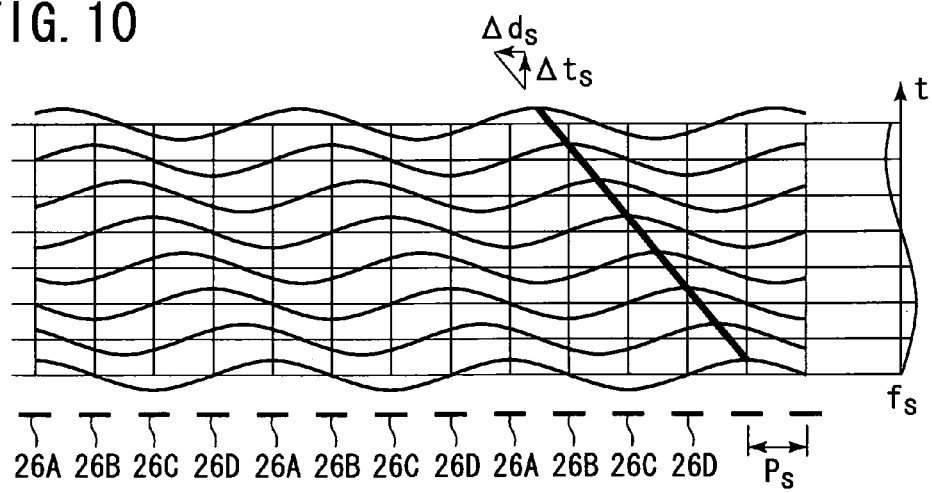
FIG. 11 is a view for explaining a traveling wave generated in the driving electrodes of a stator.

For example, assuming the frequency $f_s$ applied to the stator to be ½ of the frequency $f_m$ applied to the movable element, the thick solid line slope in FIG. 11 showing the traveling wave moving speed becomes ½ compared with the slope in FIG. 10.

Next, explanation will be given on the operation in the case where the movable element 12 and stator 10 are overlapped when the traveling wave shown in FIG. 10 is generated in the electrode arrangement space of the movable element 12 and the traveling wave shown in FIG. 11 is generated in the driving electrode arrangement space of the stator 10. The following attractive force and repulsive force are generated according to the combination of the polarity of the true electric charge in the electrode of the movable element 12 and the polarity of the true electric charge in the electrode of the stator:

(a) Attractive force when the electrode of the movable element is "+" and the electrode of the stator is "−";

(b) Attractive force when the electrode of the movable element is "−" and the electrode of the stator is "+";

(c) Repulsive force when the electrode of the movable element is "+" and the electrode of the stator is "+"; and (d) Repulsive force when the electrode of the movable element is "−" and the electrode of the stator is "−".

According to the above relationship, in the Traveling wave of the movable element 12 shown in FIG. 10 and the traveling wave of the stator 10 shown in FIG. 11, a Coulomb force acts so that the positive true electric charge "the top of the waveform" and negative true electric charge "the valley of the waveform" of these traveling waves coincide in the space. It is interesting in the AC driving that in the relation between the combinations of the above (a) and (b) or the relation between the combinations of (c) and (d), the polarity "+"/"−" is different, but if the polarities of both stator 10 and movable element 12 are simultaneously inverted, the attractive and repulsive forces are not changed. Thus, even if the true electric charge polarity of the electrode array is changed to a sine wave, the action of a Coulomb force of static electricity is almost the same as the electrostatic force acted upon application of direct current as explained in FIG. 7, if the polarity of the true electric charge of the mating side is also changed to a sine wave.

Figure 12:
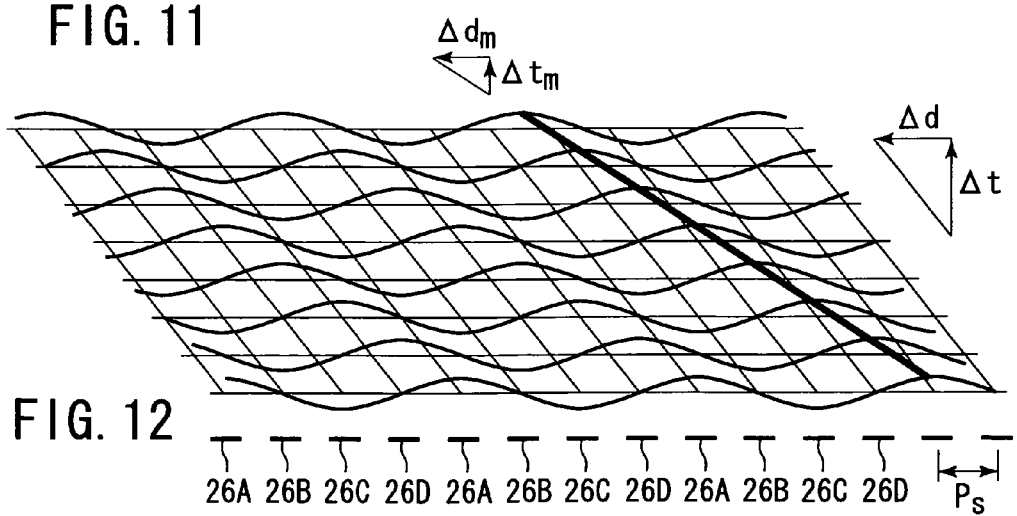
FIG. 12 is a view for explaining the principle that a movable element is moved at a predetermined speed by the mutual action of traveling waveforms.

Due to the above-mentioned action, the stator 10 moves so that the traveling wave speed of the driving electrode 26 of the stator 10 becomes equal to the traveling wave speed $V_m$ of the movable element 12, as shown in FIG. 12. In this time, the slop of the thick dotted line of FIG. 10 becomes the same as that of the thick solid line of FIG. 12, and the moving speed of the stator 10 is given by the equation $V=\Delta d/\Delta t$. For the convenience of explanation, it is assumed that the stator 10 moves at a speed of V, but the movable element 12 moves at a speed of $-V=-\Delta d/\Delta t$, taking the stator as a reference.

The speed V of the movable element 12 is given by the following equation:

$$V = V_m - V_s \quad (3)$$
$$= 2P_m \cdot f_m - 4P_s \cdot f_s$$
$$= 4P_s(f_m - f_s)$$

Next, explanation will be given on the principle of displacing the movable element 12 only by a predetermined distance by mutual phase offset action of the traveling waves generated in the stator 10 and movable element 12, with reference to FIG. 13 to FIG. 15.

Figure 13:
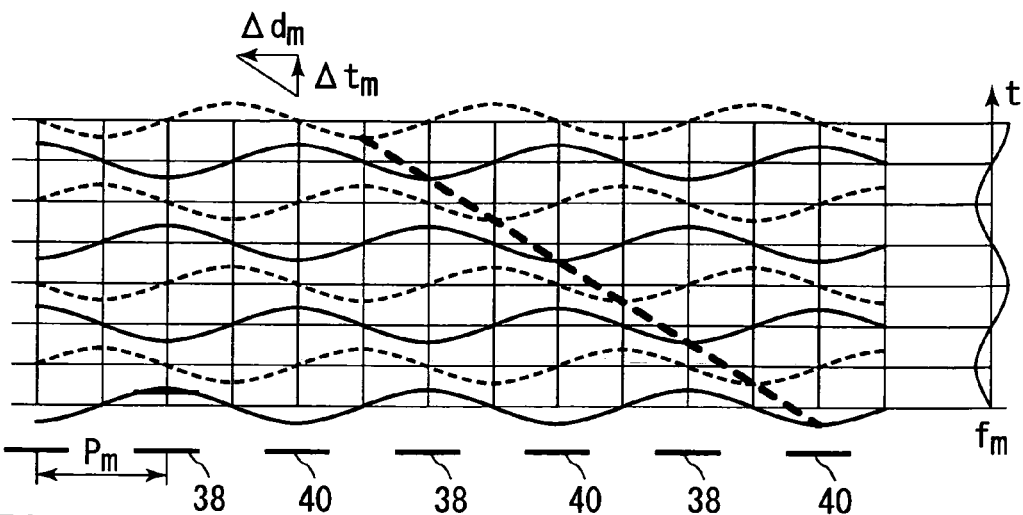
FIG. 13 is a view for explaining a traveling wave generated in a movable element.

In FIG. 13, like in FIG. 10, the thick dotted line indicates the trace of a traveling wave moving in space. Since the movable element is moved only by a predetermined distance, only the phase of the AC voltage applied to the driving electrode 26 of the stator 10 is offset halfway by $\Delta\theta$ while holding the same frequency, as shown in FIG. 14. In this time, the trace of the traveling wave moving in space is the same as the slope shown in FIG. 13 as indicated by the thick solid line, and stepped halfway.

Figure 14:
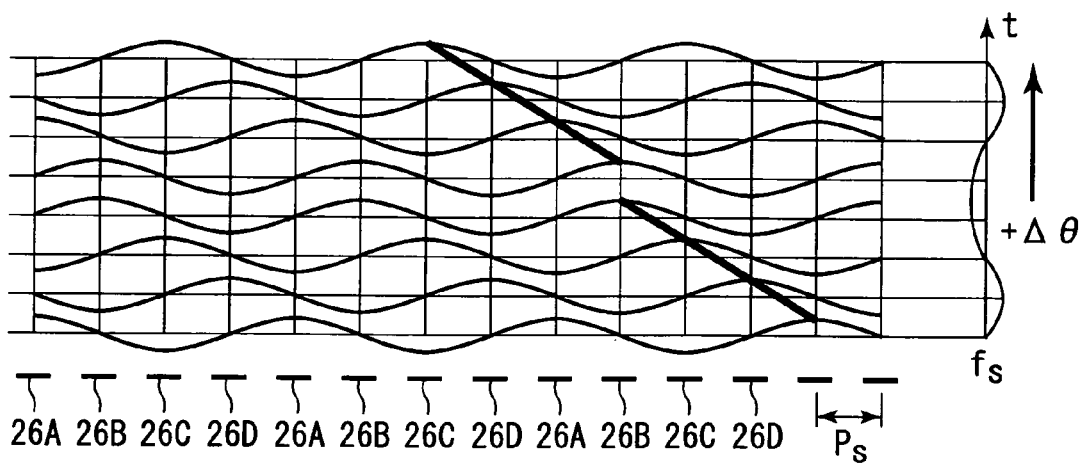
FIG. 14 is a view for explaining a traveling wave generated in a stator element when only the phase is offset halfway.
Figure 15:
FIG. 15 is a view for explaining the principle that a stator is moved only by a predetermined distance by the mutual action of traveling waveforms.

Now, explanation will be given on the operation when the stator 10 and movable element 12 are overlapped in the state that the traveling wave shown in FIG. 13 is generated in the electrode array of the movable element 12, and the stepped traveling wave shown in FIG. 14 is generated in the driving electrode array of the stator 10, as described above. FIG. 15 shows the state that the traveling waves of the stator and movable element are mutually attracted by the Coulomb force of static electricity. When the trace of space displacement of the traveling wave of the stator 10 shown in FIG. 14 is exactly overlapped on the trace of space displacement in space indicated by the thick dotted line in FIG. 13, the step of the trace disappears, but the potential distribution of the stator 10 shifts by $\Delta d$ toward the space direction. This is equivalent to simple movement of the movable element 12 by $-\Delta d$, taking the stator 10 as a reference. As described above, the movable element 12 can be moved by $\Delta d$ merely by changing (offsetting) the phase of AC voltage applied to the driving electrode 26 of the stator 10 only by $\Delta\theta$. This displacement value $\Delta d$ is given by the following equation:

$$\Delta d = 4P_s \cdot \Delta\theta/2\pi \quad (4)$$

By setting the value of $\Delta\theta$ in the unit of $\pi/2$, it is seen from this equation that the movable element is displaced by units of electrode pitch $P_s$. Further, when the electrode pitch $P_s$ is smaller, the positioning accuracy is higher. When the phase offset given to the stator 10 or movable element 12 is higher than 180 degrees, the vector phase space goes into a third quadrant and suddenly becomes equivalent to the negative phase offset. Since the movable element 12 is displaced to the direction reverse to the case of small phase offset, the phase offset given here is desirably lower than +/−180 degrees.

The concave and convex, formed by the valley (negative true electric charge) of the traveling wave of the movable element indicated by the thick dotted line in FIG. 13 and the top (positive true electric charge) of the traveling wave of the stator indicated by the thick solid line in FIG. 14, are engaged like a gear. When the engaging accuracy is higher, the positioning accuracy is higher. Even if the number of teeth is small and the engagement is rough, it is possible to control rotation more finely than the number of gear teeth as long as the teeth of gears are engaged well with little backlash. The present invention is just like this gear. By setting the phase offset $\Delta\theta$ finely with the accuracy higher than $\pi/2$, displacement is possible with the accuracy lower than the electrode pitch P. Though it depends on the electrode structure and accuracy, when the phase offset $\Delta\theta$ is set small, about ±5 degrees, for example, the corresponding displacement amount Ad is given by the equation $4P_s \cdot 5/360 = P_s/18$. In this case, when the pitch $P_s$ of the stator electrode is set to 180 μm, for example, the control is possible with the finesse of 10 μm.

Figure 16:
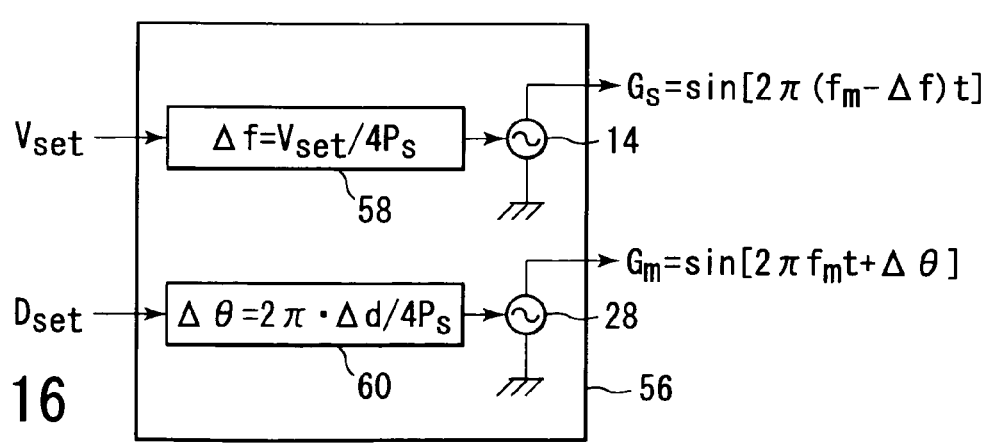
FIG. 16 is a diagram for explaining an AC driving control unit.

Next, a detailed explanation will be given on the AC driving source 28 and AC generator 14 by referring to FIG. 16. The AC driving source 28 and AC generator 14 are provided in an AC driving control unit 56. The AC driving control unit 56 is constructed by using an IC utilizing a direct synthesizer technology, a D/A converter, and a signal amplifier.

The speed $V_{set}$ and displacement amount $D_{set}$ of the movable element 12 are inputted externally as the setting for operating the actuator. The inputted speed $V_{set}$ is applied to an operating circuit 58. The operating circuit 58 calculates the equation $\Delta f = V_{set}/4P_s$. In the next stage, the AC generator 14 generates $G_s = \sin[2\pi(f_m - \Delta f)t]$, and creates a traveling wave with the driving frequency of $f_s = f_m - \Delta f$ in the driving electrode array of the stator 10. The inputted displacement amount $D_{set}$ is applied to an operating circuit 60. The operating circuit 60 calculates the equation $\Delta\theta = 2\pi \cdot \Delta d/4P_s$ from the above equation (4) by use the inputted displacement amount $D_{set}$ as the displacement amount $\Delta d$. In the next stage, the AC driving source 28 generates $G_m = \sin[2\pi f_m t - \Delta\theta)$, and creates a traveling wave in the electrode array of the movable element 12.

Since the speed V of the movable element 12 is determined by the difference between the driving frequencies $f_s$ and $f_m$ of the stator 10 and movable element 12 according to the equation (3), it is determined by the difference frequency $\Delta f$. The position of the movable element 12 is determined by the phase difference $\Delta\theta$ between the driving alternate current sources $G_m$ and $G_s$. The relation between the phase and frequency can displace to the relation between the displacement and speed. Namely, the speed V of the movable element 12 is given by the time differential of the displacement amount $\Delta d$, $V = \Delta d/\Delta t$, and determined by the frequency difference $\Delta f$ between the driving alternate current sources $G_m$ and $G_s$. On the other hand, the frequency difference $\Delta f$ has the relation $\Delta f = \Delta\theta/\Delta t$ with the time differential of phase $\Delta\theta/\Delta t$, and the following relationships are established:

$V \rightarrow \Delta f$ $\Delta d \rightarrow \Delta\theta$

Therefore, it is right to set the frequency difference $\Delta f$ to zero in the resting state or when the moving speed is zero, and set the frequency difference $\Delta f$ to a positive value for moving to the right and set a negative value for moving to the left, for example. As described above, the moving speed and displacement can be set independently by the frequency difference and phase difference, respectively. Direct control of displacement by giving a phase difference eliminates a position sensor such as an encoder, and makes the control very simple. Particularly, by applying a predetermined phase difference several times, it is possible to use the unit as a linear stepping motor and to make positioning easily in open loop.

Heretofore, explanation has been given to the electrostatic actuator using electrostatic induction, which does not require a power supply line mainly to the movable element 12. It is, however, permitted to connect a power supply line directly to the movable element 12 and generate a traveling wave in the electrode array of the movable element 12. In the above explanation, the movable element 12 comprises comb-like electrodes 38 and 40, and a potential distribution of a traveling wave is generated in the comb-like electrode array by connecting a single-phase AC power supply directly to these electrodes. The pitch of the electrode array of the movable element in this time is double the pitch of the driving electrode array of the stator, as shown in FIG. 8A to FIG. 8E. By supplying power directly to the movable element 12 as described above, a voltage drop caused by electrostatic induction is eliminated and efficient driving is possible.

Embodiment 2

Figure 17:
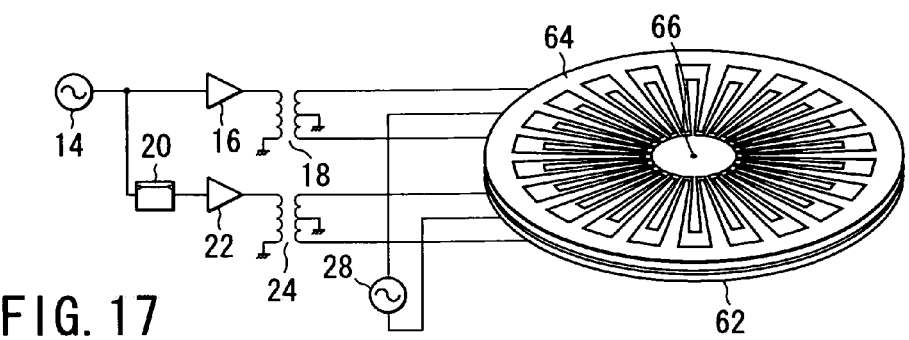
FIG. 17 is a view showing the configuration of an electrostatic actuator according to a second embodiment of the invention.

The electrostatic actuator according to a second embodiment of the present invention has a disk-like stator 62 and a rotor 64 placed on the stator, a shown in FIG. 17. A driving circuit is the same as that shown in FIG. 1. Inductive electrodes of the disk-like stator 62 are arranged circumferentially inside and outside of the circle. Driving electrodes are arranged radially from the center. In the rotor 64, two comb-like electrodes are interdigitated so that the comb teeth are radially arranged and the comb-like electrode bases are arranged inside and outside of the circumference. When it is driven, it is rotated naturally around a center 66 while keeping the rotation balance. Therefore, a rotation mechanism such as a bearing to prevent rotation shifts is not necessarily provided at the center of the rotor.

In the above-mentioned rotary actuator, the comb-like electrodes of the rotor are supplied with true electric charges by electrostatic induction. Therefore, a rotation-connecting member such as a slip ring is unnecessary, and rotation is smooth. Further, as explained in Embodiment 1, it is possible to rotate only by a predetermined angle by changing the phase. The action of rotating exactly only by a predetermined angle in open loop is similar to a conventional electromagnetic stepping motor.

Embodiment 3

Figure 18:
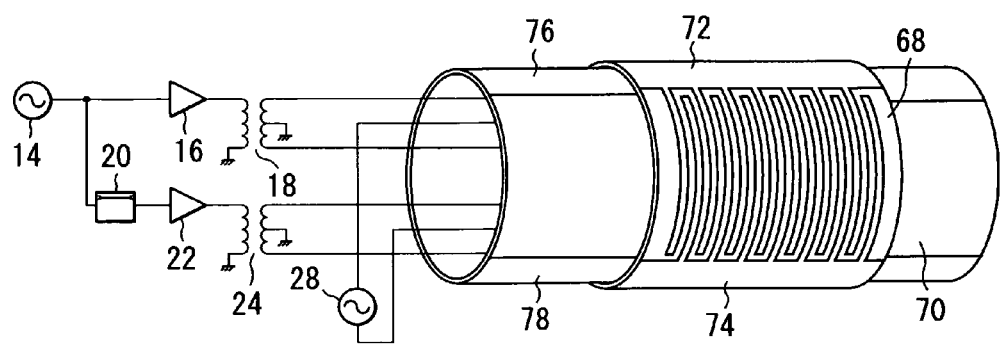
FIG. 18 is a view showing the configuration of an electrostatic actuator according to a third embodiment of the invention.

In the electrostatic actuator according to a third embodiment of the present invention, a cylindrical movable element 68 is arranged outside of a cylindrical stator 70, as shown in FIG. 18, and the cylindrical movable element 68 moves parallel on a cylinder shaft. A driving circuit is the same as the configuration shown in FIG. 1 and FIG. 17. Comb-like electrodes 72 and 74 are arranged in the cylindrical movable element 68. In the cylindrical stator 70, inductive electrodes 76 and 78 are arranged opposite to the comb-like electrodes 72 and 74, so that electrostatic induction is effectively executed in the electrode bases of the comb-like electrodes 72 and 74.

The cylindrical movable element 68 is provided outside of the cylindrical stator 70, but it can be provided inside of the cylindrical stator 70, though not illustrated.

The above-mentioned cylindrical movable actuator is similar in operation to the function of cylinder/piston. The electrostatic actuator according to this embodiment has the advantage that the inside can be made hollow.

Embodiment 4

Figure 19:
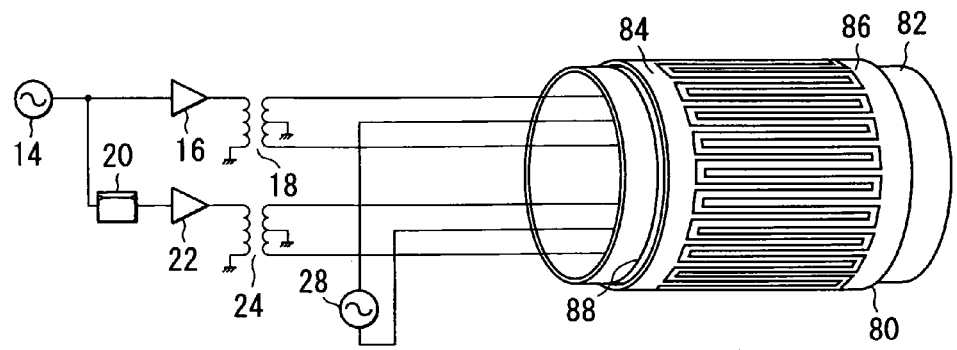
FIG. 19 is a view showing the configuration of an electrostatic actuator according to a fourth embodiment of the invention.

In the electrostatic actuator according to a fourth embodiment of the present invention, a cylindrical rotor 80 is arranged outside of a cylindrical stator 82, as shown in FIG. 19, and driving electrodes of comb-like electrodes 84, 86 and not-shown driving electrodes of the stator are arranged parallel to a cylinder shaft. This is an electrostatic actuator which rotates the cylindrical rotor 80 in the circumferential direction. In the cylindrical stator 82, an inductive electrode 88 is arranged opposite to the base of a comb-like electrode of the cylindrical rotor 80 or a movable element. The inductive electrode 88 is also provided in the side of the comb-like electrode 86, though not illustrated.

The actuator configured as above makes rotation like a roller. Like the disk rotary actuator explained in FIG. 17, this actuator eliminates the necessity of a connection mechanism such as a slip ring to supply electric charge to a movable element (cylindrical rotor 80), and the configuration is very simple.

Embodiment 5

In the electrostatic actuator according to a fifth embodiment of the present invention, as shown in FIG. 20, the stator 10 and movable element 12 are paired, and a plurality of pairs is stacked to increase the output of the electrostatic actuator. A connection member 90 is used to connect the stator 10, and a connection member 92 is used to connect the movable element 12. By controlling by applying an external power supply, a plurality of movable elements 12 is moved with the connection member 92 to the left and right in this drawing.

The stator 10 is paired with the movable element 12 as described above. Though not illustrated, it is permitted to put the movable element 12 oppositely on the front and rear sides of the stator 10. It is also permitted to insert the movable element 12 between the two stators 10 and stack them to make a multiple layer.

In the electrostatic actuator according to this embodiment, the plurality of stators 10 needs to be connected electrically in addition to be mechanically connected by the connection member 90. However, as electrical connection is unnecessary for a plurality of movable elements 12, the configuration is relatively simple.

Embodiment 6

In the electrostatic actuator according to a sixth embodiment of the present invention, as shown in FIG. 21, a plurality of laminated pairs of disk-like stator 62 and rotor 64 or a movable element is stacked to increase the output torque of the electrostatic actuator explained in FIG. 17. A rotary connection member 94 is used to mechanically connect the plurality of rotors 64. The output torque is taken from the axis of this rotary connection member 94.

The disk-like stator 62 is paired with the rotor 64 as described above. However, though not illustrated, it is permitted to put the rotor 64 oppositely on the front and rear sides of the disk-like stator 62. It is also permitted to insert the rotor 64 between the two disk-like stators 62 and stack them to make a multiple layer.

In the electrostatic actuator according to this embodiment, it is necessary to align the centers of the plurality of disk-like stators 62 when making electrical connection. However, as the rotor needs only to be mechanically connected to the rotor connection member 94, it is possible to use an insulating material such as plastic. Further, a slip ring is unnecessary, and the construction is relatively simple.

Embodiment 7

In the first to sixth embodiments explained above, the driving electrodes 26 of a stator (the stator 10, for example) are collected by four pieces for the lines A, B, C and D. The seventh embodiment of the present invention is an example which is driven from a three-phase AC power supply.

FIG. 22A to FIG. 22E like FIG. 8A to FIG. 8E show the process of forming the alternating potential distribution by the voltage applied to each electrode. Namely, FIG. 22A shows the potential waveform by the true electric charges generated by electrostatic induction in the comb-like electrodes 38 and 40 of the movable element 12. In the drawing, the black triangle indicates the potential generated by the positive electric charge in the comb-like electrode 38. The double circle indicates the potential generated by the negative electric charge in the comb-like electrode 40. In the electrostatic induction, true electric charges are generated on the surface of a conductor, the positive and negative electric charges of the comb-like electrodes 38 and 40 are attracted to each other, and the electric charges are collected at both ends of the cross section of the electrode. Since two pitches of the comb-like electrode make one cycle of space frequency and there are four sampling points, the sampling theorem is satisfied.

FIG. 22B shows the sectional relationship between the comb-like electrodes 38, 40 and three-phase driving electrodes 26R, 26T, 26S of the stator 10. The driving electrodes 26 are connected by three pieces, as shown in FIG. 22B. In FIG. 22B, the potential of the line R is indicated by a circle, the potential of the line T is indicated by a triangle, and the potential of the line S is indicated by a lozenge, respectively. The potential on the driving electrodes 26 of the whole electrode array is as shown in FIG. 22C. Since a Coulomb force of static electricity is acted between this potential distribution (FIG. 22C) and potential distribution (FIG. 22A) of the movable element 12, the force of moving to the right acts on the movable element 12 (comb-like electrodes 38, 40).

Similarly, FIG. 22D shows the space potential distribution when another voltage is applied to the three-phase driving electrodes 26R, 26T and 26S. In this case, a Coulomb force of moving the movable element 12 (comb-like electrodes 38, 40) to the left is acted between this distribution and potential distribution (FIG. 22A) of the movable element. The three-phase driving electrodes 26R, 26T and 26S are driven by a three-phase AC driving source 96. By changing the frequency or phase of the three-phase AC driving source 96, the moving speed or displacement can be changed.

As described above, the unit can also be driven by a three-phase AC power supply.

Figure 6:
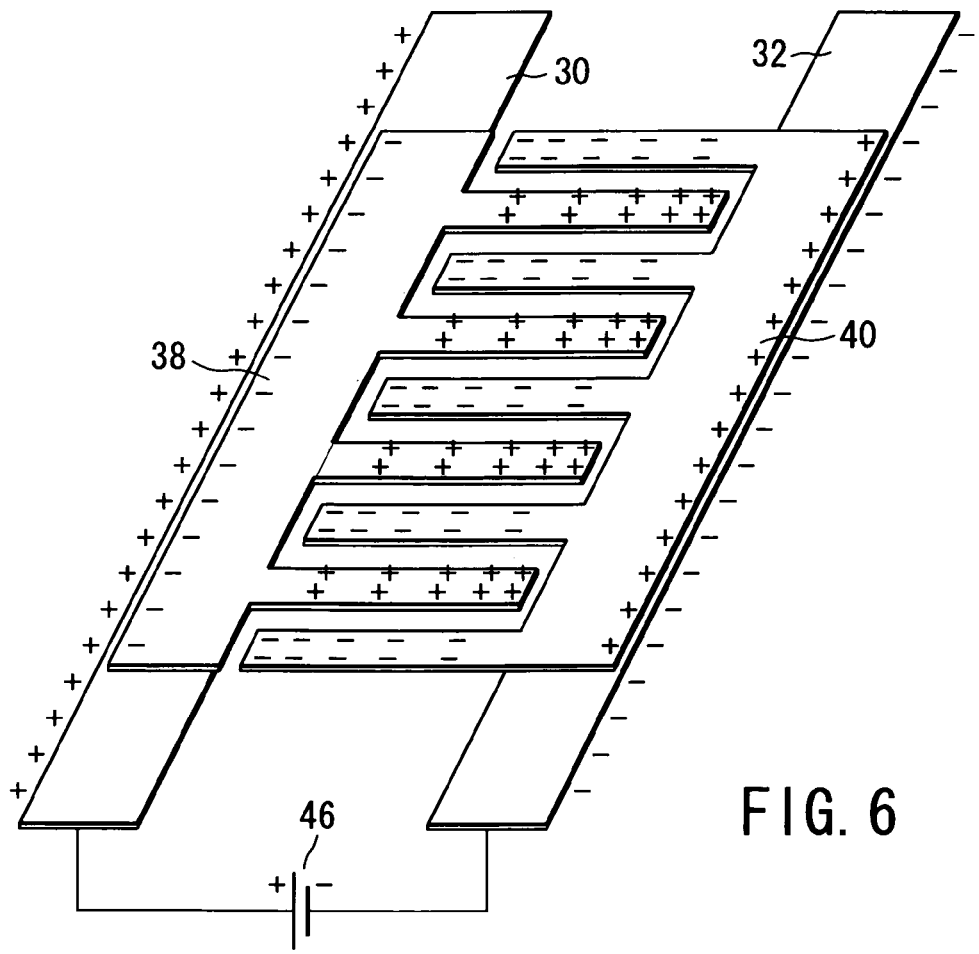
FIG. 6 is a view for explaining the principle of generating alternating electric charges in interdigital comb-like electrodes.

The electrodes of the movable element shown in FIG. 6 and FIG. 8B have been explained by using two interdigital comb-like electrodes, but they are not necessarily set as such. Another method is permitted as long as it has an induced electrode and a driven electrode, and can induce a true electric charge by electrostatic induction. Except where an induced electrode and a driven electrode are configured as one body, it is permitted, for example, to configure each electrode as a separate body and connect them electrically.

Heretofore, a movable element has been explained as being moved or rotated, but actually it is included that mechanical connection is made for a movable element and the whole body of a displacement object is moved or rotated. It is also permitted to place electrodes directly on the surface of a displacement object and use the displacement object itself as a movable element. Further, it is also permitted not to limit a displacement object to a movable element, but to fix a movable element and displace a stator of a power supply.

The displacement and driving by the phase offset explained with reference to FIG. 13 to FIG. 16 is based on the assumption that supply of electric charge to a movable element is made by electrostatic induction. However, this is not limited to an electrostatic actuator using electrostatic induction, but is applicable to a conventional electrostatic actuator which supplies power directly to a movable element. Namely, by giving a phase offset between an AC power supply connected to a movable element and a multiphase AC power supply connected to a stator, a phase shift is generated between the traveling waves of the movable element and stator, as explained in FIG. 13 to FIG. 15, though it is not illustrated. To eliminate the phase shift, the movable element is displaced by the distance equivalent to the phase offset in the movable element. Further, as explained by referring to FIG. 16, the movable element is uniquely displaced simply by giving a phase offset $\Delta\theta$ corresponding to a desired displacement amount $\Delta d$. Further, by setting the phase offset to a value lower than positive/negative 180 degrees, it is possible to make positioning with fine accuracy lower than the pitch of driving electrodes of a stator.

The electrostatic actuator of the present invention has been explained in which AC voltage is applied directly to a stator and by electrostatic induction or directly to a movable element. However, it is possible to use a high frequency for the frequency of the AC voltage, regardless of the frequency of commercial power supply. Particularly, since the moving speed of the movable element 12 is determined by the frequency difference between the AC driving sources applied to the stator 10 and movable element 12, it is possible to set the frequency to a high value close to 1 MHz. If a high frequency can be set, the high-voltage transformers 18 and 24 can be made more compact.

Further, as the unit is driven by an alternating current and the polarity is always changed to positive/negative, unnecessary charging is eliminated and stable operation is possible.

According to the embodiments explained hereinbefore, in the parallel moving type electrostatic actuator shown in FIG. 1, FIG. 18 and FIG. 20, the moving distance of a movable element can be increased by making a stator long.

In the electrostatic actuator explained in FIG. 17, FIG. 19 and FIG. 21, a rotation-connecting member such as a slip ring is unnecessary, and the unit can be made thin and compact, and stable rotation is possible.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electrostatic actuator comprising:
a movable element which is provided with electrodes; and
a stator which is provided with driving electrodes and inductive electrodes for generating electrostatic induction in the electrodes of the movable element, wherein
the electrodes of the movable element includes a driven electrode part provided at a position opposite to the driving electrodes of the stator, and an induced electrode part provided at a position opposite to the inductive electrodes of the stator; and
the movable element is displaced relatively to the stator by generating electrostatic force between the driving electrodes of the stator and the driven electrode part in the movable element in which the electrostatic induction is generated, by applying a voltage to the driving electrodes of the stator, while generating electrostatic induction in the electrodes of the movable element through the induced electrode part by applying a voltage to the inductive electrode of the stator;
wherein the electrodes of the movable element includes a first electrode and a second electrode which are shaped substantially comb-like and interdigitated; the induced electrode part corresponds to the base of the substantially comb-like electrode; and the driven electrode part corresponds to the comb tooth including the comb tooth end of the substantially comb-like electrode;
wherein the movable element is placed on the front surface of the stator and the movable element which has no electrical connection is displaced by applying a first AC voltage to the inductive electrodes of the stator and a second AC voltage to the driving electrodes of the stator; and
wherein the stator has the inductive electrodes and the driving electrodes connected and placed by four pieces with a predetermined cycle;
the movable element has the first electrode and the second electrode which are interdigitated;
the arrangement pitch of the first and second electrodes of the movable element is double the arrangement pitch of the driving electrodes of the stator; and
a first traveling wave is generated in the electrode array of the movable element by generating electric charges in the first and second electrodes of the movable element by applying the first AC voltage to the inductive electrode of the stator, and a second traveling wave is generated in the driving electrode array by applying the four-phase second AC voltage to the driving electrodes of the stator, and the movable element is displaced according to the change with time of the first and second traveling waves.

2. The electrostatic actuator according to claim 1, wherein the ratio of an electrode width to an arrangement pitch length of the electrode array comprising the first and second electrodes of the movable element is 1:3 to 2:3.

3. The electrostatic actuator according to claim 1, wherein
the voltage applied to the driving electrode of the stator is a multi-phase AC voltage with three or more phases; and
one cycle pitch composed of the first electrode and second electrode of the movable element is equal to one cycle pitch of the driving electrodes of the stator.

4. The electrostatic actuator according to claim 1, further comprising:
a first connection member which connects a plurality of movable elements; and
a second connection member which connects a plurality of stators, and that
the plurality of movable elements and stators are stacked through the first and second connection members, and the plurality of movable elements and first connection member are moved.

5. The electrostatic actuator according to claim 1, wherein
the movable element is a rotating rotor in which a first electrode with radially spreading comb-like end electrodes, and a second electrode with centripetally arranged comb-like end electrodes are interdigitated; and
the stator is composed of two or more inductive electrodes placed on the circumference of a disk, and driving electrodes connected and arranged by multiple numbers with a predetermined cycle angle.

6. The electrostatic actuator according to claim 5, wherein the rotor and stator are stacked to be multiple layers centering around a common rotation shaft, and the rotation torque generated by a plurality of rotors is taken through the common rotation shaft.

7. The electrostatic actuator according to claim 1, wherein
the movable element is composed of a first electrode having a comb-tooth shape and a second electrode having the substantially same shape which are interdigitated, and placed on the surface of a cylinder so that the directions of the first and second electrodes are aligned as a straight line, the movable element moving parallel on a cylinder shaft; and
the stator is composed of driving electrodes arranged to be aligned with two or more inductive electrodes placed on the straight lines on a cylinder.

8. The electrostatic actuator according to claim 1, wherein the movable element is a circumferentially rotating movable element composed of a first electrode having a comb-tooth shape and a second electrode having the substantially same shape which are interdigitated and placed on the surface of a cylinder so that the directions of the first and second electrodes are aligned as a circle; and
the stator is composed of two or more inductive electrodes placed on the circumference of a cylinder and driving electrodes arranged to be aligned with the inductive electrodes as a circumference.

9. An electrostatic actuator comprising:
a movable element which is provided with electrodes; and
a stator which is provided with driving electrodes and inductive electrodes for generating electrostatic induction in the electrodes of the movable element, wherein
the electrodes of the movable element includes a driven electrode part provided at a position opposite to the driving electrodes of the stator, and an induced electrode part provided at a position opposite to the inductive electrodes of the stator; and
the movable element is displaced relatively to the stator by generating electrostatic force between the driving electrodes of the stator and the driven electrode part in the movable element in which the electrostatic induction is generated, by applying a voltage to the driving electrodes of the stator, while generating electrostatic induction in the electrodes of the movable element through the induced electrode part by applying a voltage to the inductive electrode of the stator;

wherein the electrodes of the movable element includes a first electrode and a second electrode which are shaped substantially comb-like and interdigitated; the induced electrode part corresponds to the base of the substantially comb-like electrode; and the driven electrode part corresponds to the comb tooth including the comb tooth end of the substantially comb-like electrode;

wherein the movable element is placed on the front surface of the stator and the movable element which has no electrical connection is displaced by applying a first AC voltage to the inductive electrodes of the stator and a second AC voltage to the driving electrodes of the stator;

wherein the speed of the movable element is controlled by the frequency difference between the first and second AC voltages; and wherein the movable element is stopped by setting the frequency difference between the first and second AC voltages to zero.

10. An electrostatic actuator comprising:

a movable element which is provided with electrodes; and a stator which is provided with driving electrodes and inductive electrodes for generating electrostatic induction in the electrodes of the movable element, wherein the electrodes of the movable element includes a driven electrode part provided at a position opposite to the driving electrodes of the stator, and an induced electrode part provided at a position opposite to the inductive electrodes of the stator; and the movable element is displaced relatively to the stator by generating electrostatic force between the driving electrodes of the stator and the driven electrode part in the movable element in which the electrostatic induction is generated, by applying a voltage to the driving electrodes of the stator, while generating electrostatic induction in the electrodes of the movable element through the induced electrode part by applying a voltage to the inductive electrode of the stator;

wherein the electrodes of the movable element includes a first electrode and a second electrode which are shaped substantially comb-like and interdigitated; the induced electrode part corresponds to the base of the substantially comb-like electrode; and the driven electrode part corresponds to the comb tooth including the comb tooth end of the substantially comb-like electrode;

wherein the movable element is placed on the front surface of the stator and the movable element which has no electrical connection is displaced by applying a first AC voltage to the inductive electrodes of the stator and a second AC voltage to the driving electrodes of the stator; and wherein the stator has at least an array of driving electrodes arranged with a predetermined pitch on the surface of insulating base material, and a first to fourth common lines to connect the driving electrodes by four pieces;

the electrostatic actuator further comprising:

a first transformer which generates AC potentials of 0-degree phase and 180-degree phase in the arrangement space of the driving electrodes of the stator; and a second transformer which generates AC potentials of 90-degree phase and 270-degree phase in the arrangement space of the driving electrodes of the stator; and the phase of the voltage applied to the primary side of the first transformer is different by 90 degrees from the phase of the voltage applied to the primary side of the second transformer.

11. An electrostatic actuator comprising:

a stator having two or more inductive electrodes arranged one of substantially parallel and concentric and a plurality of driving electrodes arranged with a predetermined cycle;

a movable element having at least two combined electrode structures; and a displacement means for displacing the movable element by generating electric charges in the electrodes of the movable element via the inductive electrodes of the stator, and generating electrostatic force between the electric charges and the driving electrodes of the stator;

wherein the movable element is placed on the front surface of the stator and the displacement means displaces the movable element which has no electrical connection, by applying a first AC voltage to the inductive electrode of the stator and a second AC voltage to the driving electrodes of the stator; and wherein the stator has the inductive electrodes and the driving electrodes connected and placed by four pieces with a predetermined cycle;

the movable element has a first electrode and second electrode which are interdigitated;

an arrangement pitch of the first and a second electrodes of the movable element is double an arrangement pitch of the driving electrodes of the stator; and the displacement means generates a first traveling wave in the electrode array of the movable element by generating electric charges in the first and second electrodes of the movable element by applying the first AC voltage to the inductive electrodes of the stator, generates a second traveling wave in the array of the driving electrodes by applying the four-phase second AC voltage to the driving electrodes of the stator, and displaces the movable element according to the change with time of the first and second traveling waves.

* * * * *